United States Patent
Rancien et al.

(10) Patent No.: US 10,283,017 B2
(45) Date of Patent: May 7, 2019

(54) ADHESIVE LABEL

(71) Applicant: ARJOBEX, Boulogne Billancourt (FR)

(72) Inventors: Sandrine Rancien, Voiron (FR);
Brauge Laurent, Le Pin (FR)

(73) Assignee: ARJOBEX, Boulogne Billancourt (FR)

( * ) Notice: Subject to any disclaimer, the term of this patent is extended or adjusted under 35 U.S.C. 154(b) by 0 days.

(21) Appl. No.: 15/537,830

(22) PCT Filed: Dec. 15, 2015

(86) PCT No.: PCT/EP2015/079895
§ 371 (c)(1),
(2) Date: Jun. 19, 2017

(87) PCT Pub. No.: WO2016/096924
PCT Pub. Date: Jun. 23, 2016

(65) Prior Publication Data
US 2018/0005551 A1    Jan. 4, 2018

(30) Foreign Application Priority Data
Dec. 19, 2014 (FR) .................................. 14 62986

(51) Int. Cl.
*B32B 3/02* (2006.01)
*G09F 3/10* (2006.01)
(Continued)

(52) U.S. Cl.
CPC .................. *G09F 3/10* (2013.01); *B32B 7/06* (2013.01); *B32B 27/10* (2013.01); *B42D 25/382* (2014.10); *C09J 7/22* (2018.01); *C09J 201/02* (2013.01); *G09F 3/0292* (2013.01); *G09F 3/0294* (2013.01); *C09J 2201/606* (2013.01); *C09J 2400/283* (2013.01)

(58) Field of Classification Search
CPC ....... G09F 3/0291; G09F 3/0292; B32B 7/06; B32B 27/10
See application file for complete search history.

(56) References Cited

U.S. PATENT DOCUMENTS

| | | |
|---|---|---|
| 5,042,842 A | 8/1991 | Green et al. |
| 5,605,738 A | 2/1997 | McGinness et al. |
| (Continued) | | |

FOREIGN PATENT DOCUMENTS

| | | |
|---|---|---|
| EP | 0 226 367 A1 | 6/1987 |
| EP | 2 747 059 A1 | 6/2014 |
| (Continued) | | |

OTHER PUBLICATIONS

Feb. 24, 2016 International Search Report issued in International Patent Application No. PCT/EP2015/079895.

*Primary Examiner* — Elizabeth E Mulvaney
(74) *Attorney, Agent, or Firm* — Oliff PLC

(57) ABSTRACT

An adhesive label includes: a printable front side which is non-opaque to IR radiation; an adhesive layer for sticking the label to an application medium, the adhesive force of the front side being less than the gripping force of the adhesive layer; and a compound exhibiting a certain behavior when illuminated by the IR radiation through the front side, the electromagnetic response of the compound during the illumination by the IR radiation being detectable through the front side.

17 Claims, 1 Drawing Sheet

(51) Int. Cl.
*G09F 3/00* (2006.01)
*B42D 25/382* (2014.01)
*B32B 7/06* (2019.01)
*B32B 27/10* (2006.01)
*C09J 201/02* (2006.01)
*C09J 7/22* (2018.01)

(56) References Cited

U.S. PATENT DOCUMENTS

| | | | |
|---|---|---|---|
| 6,326,071 | B1 | 12/2001 | Francoeur |
| 2003/0148055 | A1* | 8/2003 | Scheubner ............... G09F 3/02 |
| | | | 428/40.1 |
| 2004/0245763 | A1 | 12/2004 | Trantoul |

FOREIGN PATENT DOCUMENTS

| | | |
|---|---|---|
| FR | 2 830 115 A1 | 3/2003 |
| FR | 2 862 906 A1 | 6/2005 |
| WO | 2004/007196 A1 | 1/2004 |
| WO | 2009/083690 A2 | 7/2009 |
| WO | 2010/043821 A1 | 4/2010 |
| WO | 2012/035284 A1 | 3/2012 |
| WO | 2012/135085 A1 | 10/2012 |
| WO | 2012/142658 A1 | 10/2012 |

* cited by examiner

ADHESIVE LABEL

The present invention relates to adhesive labels and more particularly to self-adhesive labels, in particular security labels. Security self-adhesive labels may be both authenticatable and nonforgeable. The term "nonforgeable" is understood in particular to mean that they are destroyed in the event of an attempt to detach (or peel) from the substrate on which they have been applied.

An adhesive label comprises a structure which is generally printable or customizable on its front face, known as front piece, and an adhesive layer on its back face.

Some "synthetic" adhesive labels comprise a front piece having a destructible polymer substrate, for example made of polyurethane (PU) or polyvinyl chloride (PVC).

Some of these labels make it possible to demonstrate an attempt to remove the label from the majority of the application of supports by splitting up into several pieces when peeling is initiated. On the other hand, most of these labels exhibit the disadvantage of being customizable solely by heat transfer or at least of not having optimal printability by conventional printing processes, which limits in particular the design possibilities of the labels.

Other "synthetic" adhesive labels with a front piece having a polymer substrate have the advantage of demonstrating an attempt to peel the label from its applicational support by delaminating in the thickness, a portion of the label remaining present on the applicational support due to a cohesive strength of the substrate which is lower than the adhesive strength of the adhesive layer on the applicational support. Nevertheless, it is possible to reuse the upper portion of the front piece of the peeled label by adding more adhesive and by bonding it to another support.

The publication WO 2012/135085 discloses, on self-adhesive labels with a transparent front piece, an adhesive layer and a luminescent ink invisible under ambient lighting, positioned between the front piece and the adhesive layer, the luminescent ink emitting in the visible region under exposure to ultraviolet (UV) radiation. The front piece of this label is deliberately transparent or sufficiently transparent to UV and visible wavelengths, on the one hand, to make it possible for light, in particular UV light, to pass through the front piece in order to reach the luminescent ink located underneath and to excite it and, on the other hand, to make it possible for the wavelengths emitted by the ink in the visible region to pass through the front piece and thus to be seen in return. Preferably, the transmittance of the front piece is at least 80% and preferably greater than 95% in the UV region and the visible region. This label with front piece transparent to UV and visible wavelengths makes it possible to confirm the authenticity of the label by irradiating the latter with a UV lamp, thus rendering visible the luminescent ink present under the front piece.

Such a label exhibits the disadvantage of requiring a transparent front piece, which may prove to be restricting aesthetically. This is because, if the front piece is no longer transparent but opaque to visible light, it will absorb and/or scatter the visible wavelengths and it will no longer be possible to see, under UV irradiation, the visible response of the luminescent ink present under the front piece and thus to proceed to the verification of the authenticity of the label, the visible wavelengths not passing through the opaque front piece.

This label with a transparent front piece made of polyethylene (PE), polyethylene terephthalate (PET), polyvinyl chloride (PVC), ortho-phthalaldehyde (OPA) or biaxially oriented polypropylene (BOPP) is furthermore a solely authenticatable label which does not exhibit characteristics demonstrating an attempt at forgery by destruction, tearing or cohesive failure (delaminating) of the front piece.

WO 2012/142658 discloses a self-adhesive tape carrying microscopic particles coded with identification data, the support of the tape being transparent in order to make possible the identification and the visualization of the particles after application of the tape to an applicational support.

WO 2010/043821 describes a security label, for the authentification of products, comprising a single-layer or multi-layer transparent front piece, coated with a transparent layer of pressure-sensitive adhesive, which receives printing visible under ambient lighting applied directly to the adhesive layer. After application of the label to the product to be authenticated, any attempt at detachment by a manual, mechanical, thermal or chemical means results in the irreversible destruction of the printing by cohesive failure of the adhesive layer, the cohesive strength of which is lower than the adhesive strength of the label on the product to be authenticated.

This label is nonforgeable as it exhibits obvious characteristics of falsification by cohesive failure during an attempt to detach but, on the other hand, requires a front piece and an adhesive layer which are transparent to visible wavelengths in order to make possible the observation of the printing through the front piece and the adhesive layer.

The publications EP 2 747 059, U.S. Pat. Nos. 5,042,842, 6,326,071 and 5,605,738 describe other adhesive labels.

The invention is targeted at rendering attempts at fraud by detachment of a label more difficult and it achieves this by virtue of an adhesive label comprising:

a printable front piece which is not opaque to infrared (IR) radiation, an adhesive layer for bonding the label on a support, the cohesive strength of the front piece being lower than the adhesive strength of the adhesive layer, a compound having a predetermined behaviour when illuminated by the said IR radiation through the front piece, the electromagnetic response of the said compound during the illumination by the said IR radiation being detectable through the front piece.

The compound, also known as "IR tracer", may exhibit a specific electromagnetic response to the IR radiation. It is a tracer of just one type or a mixture of several tracers of different types.

"Type of tracer" is understood to mean a compound having a given behaviour in response to a given incident radiation. Different types of tracers differ in their excitation wavelength(s) (IR radiation) and/or their absorption or emission wavelength(s).

"Printable" front piece is understood to mean a front piece suitable for conventional printing (offset, rotary letterpress, rotary flexography, photogravure, screen printing, and the like) and/or for digital printing (toner, inkjet, and the like) and/or for variable data printing (thermal transfer, direct thermal, laser, inkjet, and the like). The printable nature of the front piece may in particular be introduced by an adhesion primer or a printability layer located on the face intended for the printing and preferably on the face of the front piece opposite the adhesive layer. The face provided with an adhesion primer or with a printability layer is described as printable face.

"IR radiation" is understood to mean a combination of one or more discrete or nondiscrete electromagnetic waves emitted in the region of the infrared wavelengths, in particular between 700 nm and 5 mm. The IR radiation is preferably between 700 nm and 15 µm, preferably again between 780 nm and 3 µm and more preferably between 800 nm and 1 µm. The said IR radiation may be centred on a single wavelength or be composed of a combination of several wavelengths of, for example, between 700 nm and 5 mm, preferably between 700 nm and 15 µm, preferably again between 780 nm and 3 µm and more preferably between 800 nm and 1 µm. These wavelengths may be emitted by one or more different sources, for example simultaneously or successively by one or more diodes.

"Specific electromagnetic response" is understood to mean an absorption or an emission by the compound. In particular it is, respectively, an absorption by the compound of certain wavelengths of the incident IR radiation or an emission by the compound of an electromagnetic radiation in the visible and/or invisible region, for example in the IR region, in response to the excitation of the compound by the incident IR radiation. This electromagnetic response, when it is invisible to the naked eye, will be detected using an appropriate detector, in particular automatically. It is preferably an emission by the compound of an electromagnetic radiation in the visible and/or invisible region, in particular in the IR region, in response to the excitation of the compound by the incident IR radiation.

The invention also relates to an adhesive label intended to be applied to a support, comprising:

a printable front piece which is not opaque to infrared (IR) radiation, an adhesive layer for bonding the label on a support, the cohesive strength of the front piece being lower than the adhesive strength of the adhesive layer on the support, a compound having a predetermined behaviour when illuminated by the said IR radiation through the front piece, the electromagnetic response of the said compound during the illumination by the said IR radiation being detectable through the front piece.

The adhesive label is in particular a self-adhesive label, preferably a security self-adhesive label.

The adhesive label may exhibit, before its application on a support, a release liner, in particular silicone-coated, on the adhesive layer of the side opposite the front piece.

The label according to the invention offers the advantage that, after adhesion on the product to be authenticated, any attempt to detach the label results in delamination of the front piece by cohesive failure of the latter, the cohesive strength of which is less than the adhesive strength of the adhesive layer, in particular on the support.

The front piece may comprise a multilayer complex, comprising a core layer having cavities and two skin layers coextruded with the core layer.

The front piece is preferably not completely transparent, in particular opaque and especially white.

The front piece may be opaque to visible light and/or to UV radiation. It is preferably opaque to visible light and its opacity in the visible region, measured according to Standard ISO 2471, "Paper and board—Determination of the opacity (paper backing)—Diffuse reflectance method", is in particular greater than 70%, preferably greater than 80%.

The front piece is preferably transparent to IR radiation. "Transparent to IR radiation" is understood to mean a transmittance of the wavelengths of this IR radiation, measured by an IR spectrophotometer, of greater than 70%.

The front piece is preferably transparent to IR radiation in the range of wavelengths 700 nm-15 µm, preferably 780 nm-3 µm or preferably again 800 nm-1 µm and more preferably in the range of excitation wavelengths of the said compound.

The front piece may comprise at least one layer made of thermoplastic material, in particular polyolefin. It has preferably a layer of polyethylene (PE) and more preferably of high density polyethylene (HDPE).

The front piece can be opaque, having a multilayer structure of the type Polyart® TE produced and marketed by Arjobex; such a front piece shows delamination in the case of an attempt to detach as a result in particular of its multilayer and alveolar (presence of voids) structure.

Thus, during an attempt to forge by detachment of a label according to the invention, the compound detectable through the front piece will remain on the delaminated portion of the label comprising the adhesive layer, in particular attached to the applicational support. The other portion of the delaminated label, comprising in particular the information printed on the printable face, will not be able to be reused by the defrauder as it will no longer exhibit the electromagnetic response under IR illumination characteristic of the presence of this compound.

The adhesive layer can be a self-adhesive layer. It is preferably a pressure-sensitive adhesive.

In this case, "cohesive strength of the front piece lower than the adhesive strength of the adhesive layer" should be regarded as meaning that, on carrying out the Finat peel tests: FTM 1 or FTM 2, 24 hours after the application of the adhesive label to a standardized "Finat" glass sheet ("Finat Technical Handbook—Test Methods", $9^{th}$ edition), there is cohesive failure of the front piece and not cohesive failure in the adhesive layer or at the adhesive layer/front piece interface.

Preferably, the compound is such that the IR radiation to which it reacts belongs to the near IR (i.e., NIR), in particular in the range of wavelengths extending from 780 nm to 3 µm, preferably extending between 800 nm and 1 µm.

When the electromagnetic response of the compound is an emission by the compound of an electromagnetic radiation, it is preferably an emission in the IR region, in particular in the range of wavelengths extending from 700 nm to 15 µm, preferably in the NIR region between 780 nm and 3 µm and more preferably between 800 nm and 1 µm.

In the case of an emission of the compound in the visible region (antistokes shift), it is necessary for this emission to be sufficiently intense for it to be able to be seen through the front piece, in particular when the latter exhibits a degree of opacity. The intensity of the emission and the opacity of the front piece are in particular adjusted to one another in order to make it possible to observe the emission through the front piece.

The incident radiation may in particular be emitted by one or more diodes which emit IR light.

The said compound is preferably located, with respect to the front piece, on the same side as the adhesive layer.

The said compound may be a soluble or insoluble photoluminescent compound. It may be employed in an intermediate layer located between the front piece and the adhesive layer or in the adhesive layer itself. It may also be present over the entire surface of the label, which is preferred, or over a portion only of its surface.

The intermediate layer or the adhesive layer comprising the said compound may also comprise a filler and/or be coloured, care being taken to use fillers, pigments or dyes which do not absorb or absorb only slightly in the wavelengths selected for the IR excitation and/or which do not absorb either in the emission wavelengths of the compound, in order not to interfere with the detection of the electromagnetic response of the said compound. In particular, the adhesive layer or the intermediate layer is preferably devoid of carbon black and/or of coloured pigments which absorb in the IR region and in particular in the NIR region.

The label may comprise fillers that reflect the IR radiation in the intermediate layer and/or the adhesive layer and/or an additional layer.

In order to improve the detection of the electromagnetic response when it is an emission by the compound of an electromagnetic radiation, the intermediate layer and/or the adhesive layer, in particular comprising the said compound, may comprise fillers which reflect IR radiation, for example such as:

Sicopal® Black K 0095 from BASF,
Xfast® Black EH 0408 (0095) from BASF,
Luconyl® NG Black EH 0952 (0095) from BASF or
fillers chosen from the Arctic range from Shepherd.

Such fillers may also be used in an additional layer, preferably included, with respect to the layer comprising the said compound, on the side opposite the front piece. If the layer comprising the said compound is an intermediate layer, the said additional layer is preferably also included between the adhesive layer and the intermediate layer.

The said compound can be luminescent, in particular fluorescent or phosphorescent, under IR radiation, being chosen in particular from photoluminescent compounds emitting in the IR region and/or the visible region.

The compound may be present in the adhesive layer or in an intermediate layer between the adhesive layer and the front piece, as mentioned above. The compound is preferably present over the entire expanse of the label.

Compounds having a specific electromagnetic response under excitation in the IR region and in particular the NIR region may be detected through the front pieces opaque to visible light having a multilayer structure of Polyart® TE type as the polyethylene which is the base substance of this material is transparent in a wide range of wavelengths of the near IR and in particular those located between 800 and 1400 nm, which can be used for the detection of the said compounds. This is because the Applicant Company has found that such a front piece is, surprisingly, simultaneously opaque in the visible region and non opaque to IR radiation. A further subject-matter of the invention is a method for the authentification of a label according to the invention, comprising the following stages:

illuminating the front piece with IR radiation which leads the said compound to receive the IR radiation, detecting the response of the said compound through the front piece.

The IR radiation can be centred on just one wavelength or be composed of a combination of several wavelengths of, for example, between 700 nm and 15 µm, preferably between 780 nm and 3 µm and more preferably between 800 nm and 1 µm. These wavelengths may be emitted by one or more different light sources for the implementation of this method.

A better understanding of the invention will be able to be obtained on reading the detailed description which will follow of nonlimiting examples of the implementation of the invention and on examining the appended drawing, in which.

Figure 1:
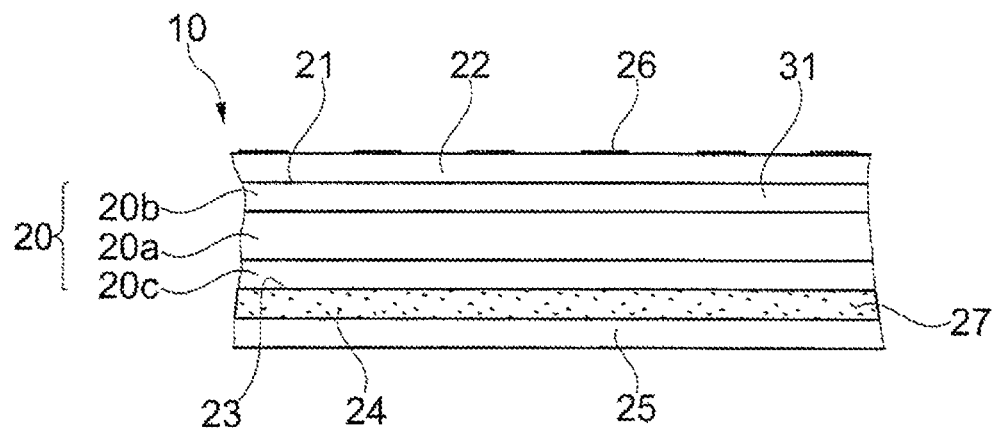
FIG. 1 represents an example of an adhesive label according to the invention.

The adhesive label 10 according to the invention, represented in FIG. 1, comprises a front piece 20 coated on a face 21 with a printability layer 22 and on the opposite face 23 with a layer 27 comprising a compound 24 having a specific response to IR radiation. A pressure-sensitive adhesive layer 25 makes possible the attachment of the adhesive label to an applicational support. The layer 27 comprising the compound 24 is intermediate between the adhesive layer 25 and the front piece 20.

The adhesive label 10 may be coated on the side of the adhesive layer 25 opposite the front piece 20 with a removable silicone-coated release liner, not represented, which is removed at the time of use. It can, for example, be a film, a kraft paper or a silicone-coated non-stick glassine, for example.

The adhesive label 10 may carry printing 26 on the printability layer 22.

The printability layer 22 may additionally comprise security elements which make possible the authentification of the label, these security elements being chosen in order not to interfere with the detection of the response specific to that of the compound present in the layer 27 when the compound is illuminated by IR radiation through the front piece.

The security elements may exhibit a "first level", "second level" or "third level" security characteristic.

"First-level security characteristic" is understood to mean a security characteristic visible to the naked eye, in daylight or in artificial light, without the use of a specific device. Such a first-level security characteristic may be a variable optical effect, such as produced, for example, by magnetic or nonmagnetic interferential platelet particles, liquid and/or oriented and/or photonic crystals, a holographic element or a network of lenses in combination with an underlying pattern, all these elements being thus adapted to form a security element with a first-level characteristic.

"Second-level security characteristic" is understood to mean an optical effect still visible to the naked eye but only with the help of a relatively simple device, such as a lamp or a pointer emitting in the ultraviolet (UV) region, the visible region or the infrared (IR) region, or of a magnifying glass or of a decoding tool of the optical filter type or of a polarizing filter. A security element with a second-level characteristic is, for example, luminescent, that is to say, for example, that it exhibits a specific emission in the visible region under the light of a Wood's lamp emitting in the ultraviolet region, for example again at a wavelength of 365 nm. Another example of a security element with a second-level characteristic is an antistokes element, that is to say an element exhibiting a specific emission in the visible region under the light of an IR pointer, for example at a wavelength of 980 nm. A second-level characteristic may also be a characteristic of a security element which is displayed in the event of contributing heat and/or rubbing.

Finally, "third-level security characteristic" is understood to mean a security characteristic requiring, for its detection, a dedicated detection device. An element exhibiting a third-level security characteristic is, for example, capable of generating a specific signal when it is subjected, simultaneously or nonsimultaneously, to one or more sources of external stress. This signal is processed and then analysed by a dedicated detection device for the purpose of authenticating or identifying the security element. Other examples of security elements exhibiting a third-level security characteristic are tracers or materials provided in the form of active materials, of particles or of fibres capable of generating a specific signal when these tracers are subjected to a mechanical, thermal, photonic, optoelectronic, electrical, magnetic or electromagnetic stress.

The security element or elements present in or on the printability layer 22 may be provided in the form of an impression, of a foil or of a patch which are affixed to the printability layer 22. In particular, the security element or elements which are affixed to the printability layer 20 may be:

an interferential multilayer film,
a structure having variable optical effects based on interferential pigments or on liquid crystals,
a birefringent or polarizing layer,
a diffraction structure,
an embossed image,
a refractive element which is partially reflecting,
a metallized, goniochromatic or holographic foil,
a layer having a variable optical effect based on interferential pigments or on liquid crystals.

The security element or elements may also be provided in the form of particles, agglomerates or fibres incorporated in the printability layer 22. In particular, the security element or elements incorporated in the printability layer 22 may be:

particles or agglomerates of particles based on pigments or dyes of Hilite type described in particular in Application EP 0 226 367, which are visible or invisible to the naked eye and which are in particular luminescent,
security fibres, which are in particular metallic, magnetic (having soft and/or hard magnetism), absorbent or excitable in the ultraviolet, visible or infrared region, in particular the near infrared (NIR) region, an automatically detectable tracer having specific and measurable characteristics of luminescence (for example fluorescence or phosphorescence), of absorption of light (for example ultraviolet, visible or infrared light), of Raman activity, of magnetism, of microwave interaction, of RF interaction, of interaction with X-rays or with XTerahertz rays or of electrical conductivity.

The front piece 20 is, in the example considered, of polymer type and for example composed of a multilayer structure produced by coextrusion, for example of the type of that sold by Arjobex under the name Polyart® TE, which exhibits a density of less than 1 g·cm$^{-3}$ and preferably of less than 0.6 g·cm$^{-3}$. Multilayer structures of this type are described in particular in the publication WO 2009/083690. It is preferably a front piece corresponding to the structures described in the publications WO 2004/007196 and WO 2012/035284 and which are incorporated here by way of reference.

The front piece is not opaque to IR radiation. Preferably, its transmittance, measured as percentage of the IR radiation in the range from 800 nm to 1 μm, is greater than or equal to 70%.

Its opacity to visible light, measured according to Standard ISO 2471, "Paper and board—Determination of opacity (paper backing)—Diffuse reflectance method", may be greater than or equal to 80%.

The front piece 20 comprises, for example, a core layer 20a comprising voids and two skin layers 20b and 20c and a printability layer at least on its external face opposite the adhesive layer, the said printability layer being intended to be printed.

The core layer 20a may be thicker than each of the skin layers 20b or 20c. The core layer 20a may have a thickness of greater than 10 μm, better still 50 μm and even better still 75 μm and each skin layer 20b or 20c may have a thickness of less than 50 μm, better still than 15 μm and even better still than 10 μm.

The front piece 20 may have a total thickness of between 70 and 120 μm. The core layer 20a comprises voids, as indicated above. The content of voids of the front piece 20 may be between 2% and 7%, preferably between 4% and 6%, with respect to the total volume of the front piece. The skin layers 20b and 20c are preferably devoid of voids emerging at their surface.

The said voids have in particular the effect:
of conferring, on the said front piece 20, opacity to visible radiation as a result of the scattering of the light by the voids, and
of conferring, on the said front piece 20, obvious characteristics of forgery, for example by delamination.

The content of voids can in particular be determined after cutting the front piece with a beam of ions (for example argon ions), which makes it possible to limit the appearance of scratches, occupancies, tears or compressions on the front piece and to retain the morphology of the front piece, thus promoting the determination of the porosity.

After having produced the section, observation may be carried out with an electron microscope, in particular using a scanning electron microscope, for example of the ESEM Quanta 200 type. It is then possible to distinguish the various layers of the front piece and the porosities. The content of voids can be calculated by the ratio of the total area of the voids present on the section to the total area of the section, by virtue of the following formula:

$$\phi = \langle \overline{P}_s \rangle = \frac{S_{void}}{S_{section}}$$

The coextrusion of the various layers 20a to 20c of the front piece 20, during its manufacture, may be carried out at a temperature of, for example, between 150 and 250° C.

The surface of the front piece may be subjected to oxidation by a treatment with electric discharges, of corona type. Such a treatment makes it possible to obtain a polar surface and also the wettability required in order to readily accept the coatings which the front piece is led to receive.

The front piece 20 and also the printability layer 22 are sufficiently transparent to a certain IR radiation to allow the detection of the specific response of the compound 24 to this IR radiation, it being possible for this detection to be advantageously carried out through the front piece 20 and the printability layer 22.

For example, the compound 24 is a tracer which is luminescent under IR radiation which, when excited by IR radiation, produces light in the IR region, which light may be detected through the front piece 20 and the printability layer 22 which are sufficiently transparent to this radiation to allow the detection thereof.

Thus, in an example of the implementation of the invention, the front piece 20 and/or the printability layer 22 are opaque to UV and/or visible radiation and transparent to IR radiation, in particular in the range between 700 nm and 15 μm. Thus, the presence of the compound 24 is undetectable in visible light on the side of the printing 26.

The layer 27 which comprises the compound 24 is, for example, a layer of the same adhesive as that constituting the layer 25.

The presence of two layers of adhesive 25 and 27, of which only one comprises the compound 24, exhibits the advantage of making possible a high concentration of this compound in the intermediate layer 27, which may facilitate the detection thereof.

Figure 2:
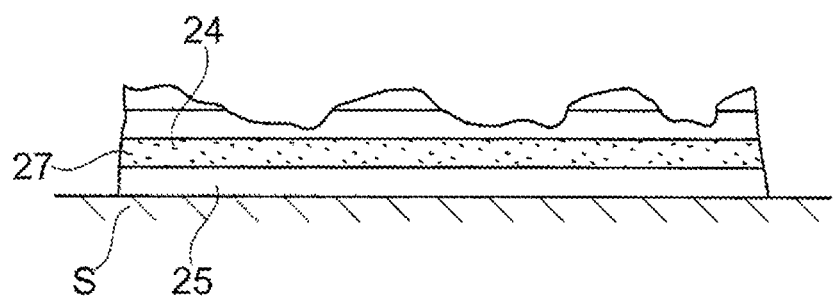
FIG. 2 represents the portion of the label which continues to adhere to the applicational support after an attempt at detachment and cohesive failure of the front piece.

In the event of an attempt to detach the label 10 by peeling, the front piece 20 undergoes cohesive failure and a portion of it remains integral with the applicational support S, as illustrated in FIG. 2. The other portion, which has delaminated, may admittedly be reused by the defrauder but does not carry the layer 27 laden with the compound 24 and thus will not exhibit the characteristics of the initial label when subjected to IR radiation targeted at detecting the compound 24.

Figure 3:
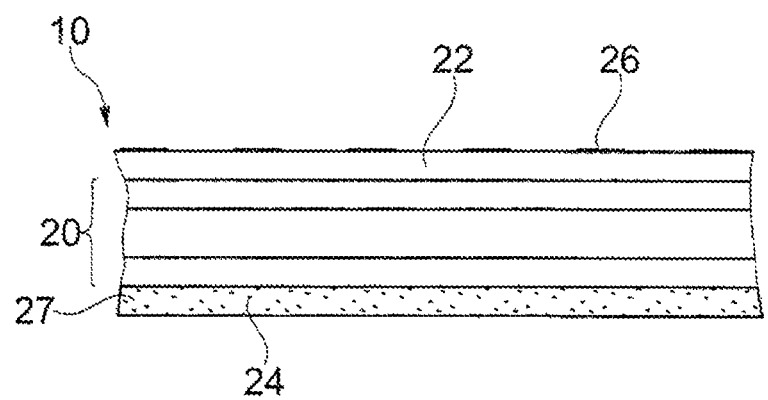
FIG. 3 is a view analogous to FIG. 1 of an alternative form of the invention.

In the alternative form of FIG. 3, the label 10 comprises just one adhesive layer 27 which comprises the compound 24 and comes into contact with the applicational support during the use of the label.

Of course, the invention is not limited to the examples which have just been described.

In particular, the compound 24 may be a luminescent compound which fluoresces, when excited by IR radiation, in visible light, the front piece 20 and the printability layer 22 being in this case sufficiently transparent to this visible light to make possible detection of the latter during the IR excitation.

In another alternative form, the compound 24 may reemit in the UV region, the front piece 20 and the printability layer 22 being in this case sufficiently transparent to this UV radiation to allow it to be detected.

The compound 24 may have a predetermined behaviour when illuminated by said IR radiation through the front piece and be present under the front piece 20 in a nonhomogenous fashion, for example being distributed nonuniformly, for example in the form of a particular pattern. In this case, the front piece 20 and the printability layer 22 are sufficiently transparent to IR radiation for the latter to be able to reach the compound 24, in order to make it possible to observe a nonuniform reflection of this IR radiation on the layer comprising the compound 24 and to thus discern the pattern formed by the latter.

For example, the compound 24 is deposited by printing under the front piece 20 or, in an alternative form, on the adhesive, in the form of a pattern or of a network of patterns.

The self-adhesive label according to the invention may be affixed to products or articles for which it is desired to authenticate the origin or the affiliation in order to provide an authentification function. This label may also be used as witness of opening or breaking into a container, the integrity of the contents of which it is desired to protect, in order to provide a nonforging function.

The front piece may, in an alternative form, be of cellulosic nature. It is, for example, a paper, the opacity of which is provided by fillers which do not absorb in the IR region. It is in particular a paper devoid of titanium dioxide.

However, preferably, the front piece is predominantly based on polyolefin, in particular on polyethylene, which exhibits a high transparency to IR radiation with only a few thin and isolated absorption bands.

Advantageously, the adhesive layer 25, on its face opposite the front piece 20, of the label is provided with a release liner comprising a non-stick coating, in particular a silicone-coated release liner. It is the support (or backing) on which the labels are placed before they are applied to the support to be rendered secure.

Advantageously, the adhesive label according to the invention comprises a filler-comprising or coloured layer, in particular an adhesive layer and preferably a coloured layer. It may be the layer 27, the adhesive layer 25 or an additional layer located on the face of the adhesive layer 25 opposite the front piece 20, between the layers 25 and 27, or on the face of the front piece 23 located on the side of the adhesive layer 25. Care will be taken in particular to use fillers, pigments or dyes which do not absorb or which absorb only slightly in the wavelengths selected for the IR excitation, in order not to interfere with the detection of the electromagnetic response of the said compound, in particular when the coloured layer is the layer 27 comprising compound 24 or when the coloured layer is located on the face of the front piece 23 located on the side of the adhesive layer 25.

Preferably, the layer 27 is coloured. It comprises in particular pigments or dyes which do not absorb or which absorb only slightly in the wavelengths selected for the IR excitation.

EXAMPLE 1

Use is made, to produce the front piece of the label, of a support sold under the make Polyart® TE with a grammage of 60 g/m$^2$ having, on one face, a printability layer suitable for conventional printing (offset, photogravure, screen printing, and the like) on its external face. This Polyart® TE is a white opaque grade of Polyart® which exhibits a density of less than 0.6 g·cm$^{-3}$ and a low internal cohesion as a result of a high content of voids. The HDPE polyethylene which is the predominant constituent of this material is transparent to infrared wavelengths located between 700 nm and 15 μm, with a few thin absorption lines at wavelengths different from those generally used for the detection, which makes it possible to envisage its use as base substance for producing a front piece transparent to the IR radiation of the detector. Polyart® TE exhibits in particular a transmittance of greater than 70% in the IR wavelengths located between 700 nm and 2 μm used for the detection of the compound through the front piece.

Labels according to the invention are produced in the laboratory using a Polyart® TE front piece and an IR/visible and IR/IR MicroTag tracer from BrandWatch. The manufacture comprises the following stages:

coating of a coating composition based on styrene/acrylic binder comprising the MicroTag tracer on the internal face of a support made of Polyart® TE, coating of a pressure-sensitive adhesive of permanent acrylic type on a silicone-coated release liner and then rolling of the adhesive over the Polyart® TE front piece on the side of the layer with tracer, so as to form the intermediate layer, conversion of the self-adhesive complex into labels by precutting to shape.

The amounts of tracers to be incorporated in the intermediate layer in order to have good detection of the tracer through the front piece with the Reveal™ detector from BrandWatch through the thickness of the front piece made of Polyart® TE are determined.

After removing the silicone-coated release liner, the labels are applied to caps of wine bottles.

The satisfactory authentification of the tracer through the front piece with the Reveal™ detector operating in the IR wavelengths located between 700 nm and 2 μm is confirmed.

An attempt to detach the label with initiation using the fingernail or a Stanley knife, thus simulating forgery by peeling the label, and then a test on reusing the delaminated portion of the label withdrawn from the first applicational support by again adding, to the back of the delaminated portion of the label, a spot of self-adhesive adhesive are carried out. It is confirmed that it is no longer possible to authenticate, with the Reveal™ detector, the tracer on the reused part of the front piece withdrawn from the applicational support, the tracer being in the delaminated portion of the label which has remained on the applicational support.

EXAMPLE 2

As for Example 1, use is made, to produce the front piece of the label, of a support sold under the make Polyart® TE with a grammage of 60 g/m² having, on one face, a printability layer suitable for conventional printing (offset, photogravure, screen printing, and the like) on its external face.

Labels according to the invention are produced in the laboratory using a Polyart® TE front piece and the MicroTag tracer from BrandWatch.

The manufacture comprises the following stages:

coating, on the internal face of the support made of Polyart® TE, of 10 g/m² of a coloured coating composition comprising the MicroTag tracer, the layer being formulated with a styrene/acrylic binder and a Cartaren Blue CBR 500 pigment in a concentration sufficient to contribute the blue colouration to the layer, coating, on a silicone-coated release liner, of a pressure-sensitive adhesive of permanent acrylic type at a level of 25 g/m² and then rolling of the adhesive over the Polyart® TE front piece on the side of the layer with MicroTag tracer, conversion of the self-adhesive complex into labels by precutting to shape.

After removal of the silicone-coated release liner, the labels are applied to canisters made of high density polyethylene (HDPE).

The satisfactory authentication of the tracer through the front piece with the Reveal™ detector is confirmed.

An attempt to detach the label with initiation using the fingernail or a Stanley knife, thus simulating forgery while peeling the label, is carried out.

It is observed, after detachment of the label, that the portion of the label which has remained on the applicational support shows a blue surface, indicating that forgery has taken place.

An attempt is subsequently made to reuse the delaminated portion of the label withdrawn from the first applicational support by again adding a spot of adhesive adhesive to the back and this label is applied to another support. It is confirmed that it is no longer possible to authenticate the tracer with the Reveal™ detector on the label thus reformed.

EXAMPLE 3

Use is made, to produce the front piece of the label, of a support sold under the make Polyart® TE with a grammage of 67 g/m² having a layer suitable for inkjet printing on its external face. This inkjet Polyart® TE is a white and opaque grade of Polyart® for labels which exhibits a density of less than 0.6 g·cm⁻³ and a low internal cohesion as a result of a high content of voids.

Labels according to the invention are prepared in the laboratory using a Polyart® TE front piece and one of the tracers sold by Stardust, in particular an IR/IR tracer which exhibits a specific electromagnetic response between 1000 and 2000 nm under excitation of an IR-emitting diode emitting at 940 nm and thus in a range of wavelengths in which the Polyart® TE exhibits a high percentage of transmission.

The manufacture comprises the following stages:

coating, on the internal face of the support made of Polyart® TE, of 10 g/m² of a coloured coating composition comprising a Stardust tracer, the layer being formulated with a styrene/acrylic binder and a Cartaren Blue CBR 500 pigment nonabsorbing at 940 nm in a concentration sufficient to contribute the blue colouration to the layer, coating, on a silicone-coated release liner, of a pressure-sensitive adhesive of permanent acrylic type at a level of 25 g/m² and then rolling of the adhesive over the Polyart® TE front piece on the side of the layer with Stardust tracer, conversion of the self-adhesive complex into labels by precutting to shape.

The amounts of tracers to be incorporated in the intermediate layer in order to have good detection of the tracer through the front piece with the IRIS detector from Stardust through the thickness of the front piece made of Polyart® TE is determined.

After removal of the silicone-coated release liner, the labels are applied to cases made of coated white board.

The satisfactory authentification of the tracer through the front piece of the label with an IRIS reader is confirmed.

An attempt to detach the label with initiation using the fingernail or a Stanley knife, thus simulating forgery while peeling the label, is carried out. It is observed, after detachment of the label, that the portion of the label which has remained on the applicational support shows a blue surface, indicating that forgery has taken place.

An attempt is subsequently made to reuse the delaminated portion of the label withdrawn from the first applicational support by again adding a spot of self-adhesive adhesive to the back and this label is applied to another support. It is confirmed that it is no longer possible to authenticate the tracer with the IRIS reader on the label thus reformed.

The invention is not limited to the examples which have just been described.

It is possible in particular to deposit the IR tracer by printing on the adhesive face.

The expression "comprising a" should be understood as being synonymous with "comprising at least one", and the expression "of between" is understood to mean limits included.

The invention claimed is:

1. Adhesive label, comprising:
   a printable front piece which is not opaque to IR radiation,
   an adhesive layer for bonding the label on an applicational support, an adhesive strength of the front piece being lower than an adhesive strength of the adhesive layer, and
   a compound having a predetermined behavior when illuminated by the IR radiation through the front piece, an electromagnetic response of the compound during the illumination by the IR radiation being detectable through the front piece, wherein the compound is present in the adhesive layer or the compound is present in an intermediate layer between the adhesive layer and the front piece, the front piece having an opacity in the visible region of light that is greater than 70%.

2. Label according to claim 1, the electromagnetic response being an absorption or an emission by the compound.

3. Label according to claim 1, the front piece comprising at least one layer made of thermoplastic material.

4. Label according to claim 1, the compound being luminescent under IR radiation.

5. Label according to claim 1, the IR radiation being a combination of one or more electromagnetic waves emitted in the region of the infrared wavelengths.

6. Label according to claim 1, the compound being present in the adhesive layer.

7. Label according to claim 1, the compound being present in the intermediate layer between the adhesive layer and the front piece.

8. Label according to claim 7, the intermediate layer comprising a filler or being colored.

9. Label according to claim 1, the compound being present over an entire expanse of the label.

10. Label according to claim 1, the front piece being opaque to visible light.

11. Label according to claim 1, the front piece being opaque to UV radiation.

12. Label according to claim 1, the front piece being substantially transparent in the 700 nm-15 µm range.

13. Label according to claim 1, the front piece comprising a multilayer complex comprising a core layer having cavities and two skin layers coextruded with the core layer.

14. Label according to claim 1, additionally comprising fillers that reflect the IR radiation in the intermediate layer and/or the adhesive layer and/or an additional layer.

15. Method for the authentification of a label as defined in claim 1, comprising the following stages:
    illuminating the front piece with IR radiation which leads the compound to receive the IR radiation, and
    detecting the response of the compound through the front piece.

16. Method according to claim 15, the IR radiation being a combination of one or more discrete or nondiscrete electromagnetic waves emitted in the region of the infrared wavelengths.

17. Adhesive label, comprising:
    a printable front piece which is not opaque to IR radiation, the front piece comprising a multilayer complex comprising a core layer having cavities and two skin layers coextruded with the core layer,
    an adhesive layer for bonding the label on an applicational support, a cohesive strength of the front piece being lower than an adhesive strength of the adhesive layer, and
    a compound having a predetermined behavior when illuminated by the IR radiation through the front piece, the electromagnetic response of the compound during the illumination by the IR radiation being detectable through the front piece.

* * * * *